May 11, 1926.

J. L. DOUGLASS

BUMPER

Filed March 30, 1925

1,584,081

WITNESSES

INVENTOR
JOHN L. DOUGLASS
BY
ATTORNEYS

Patented May 11, 1926.

1,584,081

UNITED STATES PATENT OFFICE.

JOHN L. DOUGLASS, OF NEW YORK, N. Y., ASSIGNOR TO ISABEL S. DOUGLASS, OF NEW YORK, N. Y.

BUMPER.

Application filed March 30, 1925. Serial No. 19,519.

This invention relates to bumpers of the character used upon automobiles upon the front thereof.

The principal object of the present invention is to produce a bumper of the cushion type of comparatively simple construction and characterized by strength, durability and resiliency.

With the foregoing and other objects in view, the invention resides in the particular provision, relative disposition, and functions of the parts hereinafter fully described and illustrated in the accompanying drawing, in which.

Referring now more particularly to the drawings, it will be apparent that the bumper of the present invention generally consists of a shock-absorbing element 10, and supporting an attaching gear 11, which serves for supporting the element 10 and for effecting the attachment thereof to parts of an automobile. The element 10 may be made of any preferred material and may be of any shape and size. In the present instance the element 10 is made of a high grade quality of rubber, or composition rubber and fabric, is of hollow construction to provide an air space. The element 10 is provided with air passages 12, which may be located at any desirable points in the walls of the element 10, and in the present instance are located in the opposite ends thereof. These passages or vents allow the atmospheric air to enter the interior of the element 10, and also permit the air within the element to pass out of the element when the element is subjected to a shock of any kind. It will be noted, in proportion to the volume or head of air within the element 10, the passages 12 are small, so that the air within the element being subjected to pressure will be able to yield in that a portion will pass out of the passages 12 but not so fast as to permit a too ready collapsing of the wall of the element, and, at the same time, serving to effectively cushion any blow or shock applied to the wall of the element.

Figure 1:
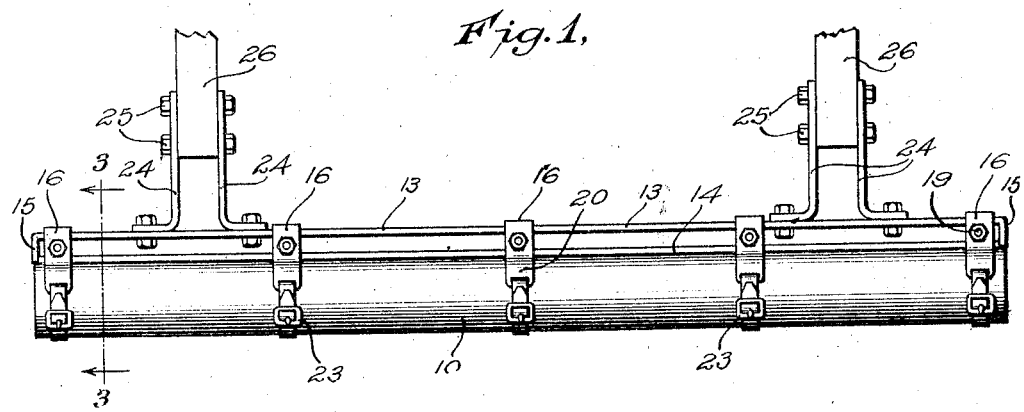
Figure 1 is a plan view of the bumper of the present invention shown as applied to the front chassis extremities, portions of which are shown, of an automobile.
Figure 2:
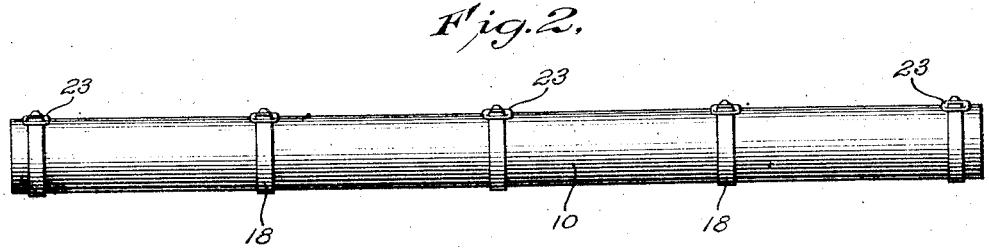
Fig. 2 is a front elevation.
Figure 3:
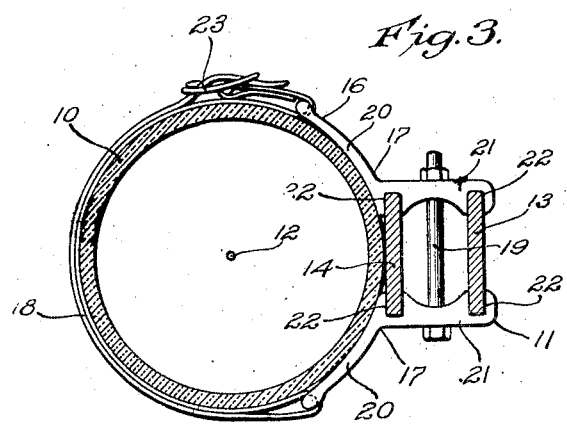
Fig. 3 is a transverse sectional view on the line 3—3 of Fig. 1 and looking in the direction indicated by the arrows.

The supporting and attaching gear 11 includes bars 13 and 14 preferably of metal and each being equal in length to the length of the element 10. The bar 13 is provided with right-angularly disposed portions 15, which respectively abut the opposite ends of bar 14, as shown in Fig. 1, to prevent relative longitudinal movement of the bars 13 and 14. The gear 11 also includes holders 16, which are supported by the bars 13 and 14, and serve to yieldably support the element 10. Each of the holders 16 comprises a pair of holder members 17, a flexible strap or band 18, and a fastening element in the form of a bolt 19. Each of the holder members 17 comprises relatively angularly disposed portions 20 and 21, the portion 20 having an opening in the extremity thereof, and the portion 21 being provided with notches or recesses 22 in spaced relationship. One holder member 17 is arranged on top of the bars 13 and 14, the edges of the bars being disposed respectively in the notches 22. The other holder member 17 is arranged at the bottom of the bars and its notches 22, respectively receive the lower edges of said bars, as shown most clearly in Fig. 3. The holder members 17 of each holder 16 are arranged in vertical alinement, and openings respectively in the portions 21 of the holder members accommodate the bolt 19. The strap or band 18 passes through the openings in the extremities of the portions 20 of the holder members, and passes around the front wall of the element 10, and the ends of the bands are connected by virtue of a buckle 23. The gear 11 also includes attaching brackets 24 arranged in pairs on the bar 13, as shown most clearly in Fig. 1. The said pairs of brackets 24 carry suitable bolts 25, by virtue of which the bumper in its entirety is attached to parts of an automobile, such as the extremties 26 of the chassis.

From the foregoing it will be apparent that there has been described a bumper of the cushion type, by virtue of the use of the element 10 of a vented air-filled character, which is capable of withstanding severe shocks, and which, at the same time, yields and cushions to the point of preventing unnecessary breakage either to the bumper parts themselves or to the colliding or collided objects.

What is claimed is:

1. In a bumper, a vented air-filled element of resilient material.

2. In a bumper, a vented air-filled cylindrical element of resilient material.

3. In a bumper, a vented air-filled element of rubber.

4. In a bumper, a vented air-filled element of resilient material, and a supporting and attaching gear for supporting said element and effecting the attachment thereof.

5. In a bumper, a vented air-filled element of resilient material, and a supporting and attaching gear for supporting said element and effecting the attachment thereof, said gear including relatively spaced holders associated with said element, each of said holders including a flexible band embracing a wall of said element.

6. A bumper comprising a vented air-filled element of resilient material, spaced bars extending longitudinally with respect to said element, holders carried by said bars, said holders having flexible means for detachably connecting said element to be carried by said holders, and attaching means carried by one of said bars for effecting the attachment of the bumper.

7. The combination with the running gear of a vehicle, of a vented air element, and means for attaching said element to said running gear and for yieldingly supporting said element.

JOHN L. DOUGLASS.